3,700,463
COFFEE EXTRACTION PROCESS

Gregory L. Bolt and Rudolf G. K. Strobel, Colerain Township, Hamilton County, Ohio, assignors to The Procter & Gamble Company, Cincinnati, Ohio
No Drawing. Filed Oct. 2, 1970, Ser. No. 77,755
Int. Cl. A23f 1/08
U.S. Cl. 99—71                                  8 Claims

ABSTRACT OF THE DISCLOSURE

A method of producing a soluble coffee extract wherein the flavor balance of brew-likeness, strength, acidity, and aromatic notes are controlled in the fresh extraction column of a multi-column extraction train. The combination of pressures, temperatures, and cycle times of 5 p.s.i.a.–35 p.s.i.a., 160° F.–260° F., and 5–45 minutes, respectively, are used in the fresh extraction column to obtain a desirable balance of flavor components. The temperatures and pressures utilized result in a vapor phase in the fresh extraction column which in turn is responsible for the improved product of this invention.

BACKGROUND OF THE INVENTION

This invention relates to a method of producing a coffee extract by a countercurrent extraction process wherein the pressure, temperature, and time are adjusted and controlled within critical limits to produce an extract having a desired balance of flavor components.

In the commercial production of soluble coffee, water is passed through multiple percolator or extraction columns containing roast and ground coffee to produce an aqueous extract. The fresh water continually flows into a battery of columns, entering at the bottom of the column containing the most nearly spent coffee grounds and passing in series through progressively fresher coffee columns. Periodically, extract is withdrawn from the column containing the freshest coffee. When essentially all of the water solubles in the roast and ground coffee in the most nearly spent coffee column have been extracted, the column is disconnected from the system. The coffee grounds are discharged and the column is refilled with fresh roast and ground coffee. When a column is disconnected from the system, a standby column containing fresh coffee is cut into the system but at the opposite end of the train.

The single column from which the extract is withdrawn from the system is generally referred to as the "first coffee stage" because it contains the freshest coffee. The "last coffee stage" is the column where the water enters the system: it contains the most nearly spent coffee. When a new column is put into the system, the column comprising the first coffee stage becomes the second; the second column or stage, the third; and so on down the line to the last coffee stage which contains the most nearly spent coffee.

The number of columns in a countercurrent extraction system can be varied from about 4 to about 12, but more practically from about 5 to about 8.

The prior art is replete with disclosures on methods for improving the extraction process for upgrading the taste of instant coffee. For example, U.S. Pats. 2,915,399, 2,915,403, and 3,089,722 all contain disclosures for regulating the temperature of the extraction water as it passes through the extraction system in order to give a specific water temperature profile designed to increase the number of desirable flavors. In particular, U.S. Pat. No. 2,915,399 discloses cold extraction temperatures, e.g. 200° F. in the fresh extraction column as well as the teaching that pressures in all the columns are controlled to maintain liquid phase conditions.

The method disclosed in this invention has reference to the operating conditions employed in the fresh extraction column for the purpose of controlling the flavor notes in the coffee extract.

It is a general object of this invention to provide an improved countercurrent water extraction process which produces coffee solubles with good coffee flavor, taste, and aroma.

It is a specific object of the present invention to control the operating conditions in the fresh extraction column to obtain the desired balance of flavor notes in the coffee extract.

It is a more specific object of the present invention to use pressure, temperature, and time of extraction in the fresh extraction column to adjust and control the flavor attributes of a coffee extract.

These and other objects will become apparent from the description that follows.

SUMMARY OF THE INVENTION

This invention relates to the production of instant coffee and more particularly to an improved countercurrent extraction process in which the pressures, temperatures, and cycle time in the fresh extraction column or first coffee column are carefully controlled within critical limits to produce coffee extract having the desired balance of brew-likeness, strength, acidity, and aromatic notes. As used herein the terms "fresh extraction column" and "first coffee column" are used interchangeably.

More specifically, fresh extraction column temperatures of 160° F. to 260° F. and pressures of 5 p.s.i.a. to 35 p.s.i.a. are utilized so that a vapor phase exists in the fresh extraction column. These fresh extraction conditions coupled with cycle times of 5 minutes to 45 minutes produce the desired coffee extracts.

DESCRIPTION OF THE INVENTION

This invention relates to an improvement in the production of soluble coffee extract by the process wherein extract liquor is passed through multiple extraction columns containing roast and ground coffee. By this process the extraction liquor continually flows in series through a plurality of columns, entering at the bottom of a column containing the most spent coffee, exiting at the top of this column and thereafter passing in similar fashion through the columns of progressively fresher coffee. Periodically extract is withdrawn from the column containing the freshest coffee, i.e. the fresh extraction column. When essentially all of the water solubles in the roast and ground coffee in the most nearly spent coffee column have been extracted, the column is disconnected from the system; the coffee grounds are discharged and the column is refilled with fresh roast and ground coffee. When the column is disconnected from the system a standby column containing fresh coffee is cut into the system at the opposite end of the extraction train. The process of this invention is concerned with the extraction conditions employed in the column containing the fresh roast and ground coffee, i.e. the first coffee column.

By the adjustment and control of pressure, temperature, and cycle time in the fresh extraction column, the desired balance of brew-likeness, strength, acidity, and aromatic notes are obtained. It has been unexpectedly found that these operating conditions act in combination when applied to the fresh extraction column to have a profound effect on the flavor characteristics of the coffee extract. Under the temperature and pressure conditions of this invention a vapor phase is formed within the column which in turn unexpectedly has been found to be responsible for the improved resultant coffee extract.

The temperatures used in the fresh extraction column must be maintained high enough to efficiently extract the fresh solubles but not so high as to cause excessive degradation of temperature sensitive flavor components. The temperature in conjunction with the extraction time (to be discussed hereinafter) controls the balance of brew-like flavors, strength, and acidity. It should be understood that the temperature of the roast and ground coffee and the extraction liquor in any given column in a coffee extraction system including the fresh extraction column is not in a steady state. Thus, the temperature of the grounds and extract liquor within the fresh extraction column of this invention may be varying constantly within the prescribed temperature range. Accordingly, the temperatures set forth herein with reference to any given column is the prevailing temperature at the inlet to the column at the moment before draw-off begins from the fresh extraction column. It should also be realized that the specific temperature maintained in the fresh extraction column is dependent on the pressure maintained in the column. With these considerations in mind, the temperature maintained in the fresh extraction column is 160° F. to 260° F. Temperatures above 260° F. result in a heat degradation of flavor components to such an extent that the flavor of the resultant coffee extract is not pleasing to the average consumer. An extraction temperature below 160° F. is avoided because of the fact that flavor components present in the fresh roast and ground coffee and desired for the coffee extract of this invention are not sufficiently extractable at this relatively low temperature. Preferably, a temperature range of 180° F. to 250° F. is maintained. Most preferably, a temperature range of 220° F. to 250° F. has been found to give an especially flavorful coffee extract.

In conjunction with the temperature maintained in the fresh extraction column, the specific cycle time must be maintained strictly. As used herein, cycle time is defined as the time interval between successive draw-offs of extract liquor. The overall process time is the time required for a column to pass from the first coffee stage, i.e. fresh extraction column, to the last coffee stage and be disconnected from the system. When extracting at temperatures within the above disclosed temperature ranges, excessive degradation reactions can occur of lengthy cycle times are used. Preferably, the cycle time is as low as possible, to minimize unwanted degradation reaction. In accord with this invention, cycle times of 5 minutes to 45 minutes, in conjunction with the above disclosed temperatures and below disclosed pressures, result in a flavorful coffee extract. A cycle time of 15 minutes to 35 minutes is especially preferred. The most preferred cycle time is 15 minutes to 25 minutes.

The other operating condition found to be critical in the fresh extraction column when taken in conjunction with the above temperature and cycle time ranges is the pressure. The pressure maintained in the fresh extraction column is used to both control the extraction temperature and the amount of aromatic flavor notes obtained. These desirable aromatic flavor notes are obtained when a vapor phase is maintained in the fresh extraction column. Whether or not a vapor phase exists in the fresh extraction column depends on use of the proper pressure and temperature conditions.

During conventional fresh extraction operations a pressure is maintained within the system that is high enough that a liquid phase is maintained within the column. According to this invention the pressure maintained in the fresh extraction column is such that a vapor phase will develop within the column. That is, when the aqueous extract is first introduced into the fresh extraction column it is liquid, but when it exits at the top of the column a portion of it is a vapor. In accordance with this invention up to 10% by weight of the extraction liquor is transformed into a vapor within the column. As the liquid contacts the roast and ground coffee, the coffee is heated and approaches the inlet temperature of the extract liquor. The point in the column where vapor transformation takes place is that point where the pressure permits this transformation. Thus, because of the relatively low temperature needed to minimize the heat degradation of flavor components, relatively low pressures are necessitated to obtain a vapor phase within the column. In the absence of this partial vapor evolution the aromatic flavor notes are not captured. When employing temperatures within the ranges specified herein, a pressure range of 5 p.s.i.a. to 35 p.s.i.a. as measured at the top of the column is preferred to obtain the vapor phase, and therefore to obtain a desirable balance of flavors. A most preferred pressure range used in conjunction with the temperature of this invention is 15 p.s.i.a. to 20 p.s.i.a.

When the above disclosed temperature, cycle time, and pressure parameters are used in the fresh extraction column, the resultant coffee extract contains a very desirable balance of brew-likeness, strength, acidity, and aromatic flavor notes. The observance of these critical conditions in the fresh extraction column thus results in an overall improvement in the countercurrent extraction of roast and ground coffee. In summary, it can be seen that the relatively low fresh extraction column temperatures of this invention allow sufficient extraction but minimize degradation reactions of flavor components; the cycle times are related to the extraction temperature to insure a minimum of degradation reactions at the specific extraction temperature; and the pressures employed in the fresh extraction column must be relatively low to maintain a vapor phase in the column in connection with the particular temperatures employed.

Operation of the fresh extraction column under the conditions specified herein creates within the column a vapor phase in equilibrium with a liquid phase. Unexpectedly, the maintenance of a vapor phase in the fresh extraction column is responsible for the excellent flavor notes obtained in the resultant coffee extract. Prior art processes are operated under temperature and pressure conditions such that an all-liquid phase is maintained in the column with the result that a less aromatic coffee extract, when compared to the coffee extract obtained by following the disclosure found herein, is produced.

The extract liquor and vapor exiting from the fresh extraction column is passed through a heat exchanger to condense the vapors. The extract liquor and now condensed vapors are collected and thereafter treated by conventional concentration and drying techniques, as described in Sivetz, Coffee Processing Technology, vol. II, chapters 11 and 12, to produce the final dry instant coffee product.

A brief description of a typical countercurrent coffee extraction system of which this invention forms an improved part of is included herein to illustrate the operation of this invention. The operation of such a system is well understood and many modifications and variations will be apparent to those skilled in the art from the descripton and examples that follow.

A plurality of extraction columns filled with roast and ground coffee are connected in series by piping between the individual columns. Typically, six columns are found in the countercurrent extraction system, and therefore this description is given with reference to a six-column system. The last three columns, i.e. those containing the most spent coffee grounds, are referred to collectively as the hydrolysis columns, while the next two columns which contain coffee grounds of an intermediate degree of spentness are the extracting columns with the first column which contains the freshest coffee grounds being referred to as the fresh extraction column. As above noted, the extraction columns are intended to be used with roast and ground coffee; however, it should be realized that it can be adapted to the extraction of whole coffee beans.

The extraction liquid, which can be either water or a dilute aqueous coffee extract obtained from another source, enters the column containing the most nearly spent coffee grounds at the lower extremity of the column and is discharged at the top of the column. The outlet line from from one column is directly connected to the inlet line of the next column. The extraction liquid progresses from column to column in the series entering each column at the bottom and being discharged from the top. Heat exchangers are fitted in the lines between the columns immediately prior to the extraction liquid inlet to the columns. The heat exchangers can be used when required to achieve or to maintain the hydrolysis temperature, i.e. about 320° F. to 360° F. in the hydrolysis columns of the extraction system. They can also be used in the extraction columns to cool or to heat the extraction liquid to any desired extracting temperature, i.e. usually within the range of from 270° F. to 310° F. Each column is fitted with a means for charging the column with roast and ground coffee, for discharging the coffee from the column, and for keeping the coffee in the column during the overall extraction cycle. The column which the extract liquor enters just prior to being withdrawn from the system contains the freshest coffee and is called the fresh extraction column. It is with respect to the conditions that are maintained within this fresh extraction column that this invention is concerned.

In most systems, an extra column is provided in each series so that the extraction operation is not interrupted while the most nearly spent coffee column is being emptied and refilled. The extra column is a standby column which is cut into the system either slightly before or simultaneously with the removal of the most nearly spent coffee column.

In the operation of the system, aqueous extract is drawn off at a draw-off ratio of about 1.5 to 2.5. As is well known to those skilled in the art, the draw-off ratio is the amount of extract withdrawn from the fresh extraction column during one cycle compared to the average weight of coffee in the individual columns. Preferably, a draw-off ratio of 1.7 to 2.3 is employed.

After extract is drawn off from the fresh extraction column, a new column containing fresh roast and ground coffee is cut into the system with the original fresh extraction column becoming the next succeeding stage, and so on to the point where the column that originally contained the most nearly spent coffee, is removed from the system. The column removed from the system is cleared of the spent coffee grounds and charged with fresh roast and ground coffee to now become the standby fresh extraction column.

After emission from the extraction system, the extract is preferably concentrated to at least 45% solubles concentration and preferably to 50% solubles concentration, and then dried by well known spray drying, freeze drying, or drum drying techniques. The flavor, taste, and aroma of the dried product can be supplemented by the adidtion of coffee oil or by the addition of a steam distillate either before or after drying by any one of a number of known methods.

The following example illustrates the process of this invention. Unless otherwise stated, all percentages are given on a weight basis.

A pilot plant extraction train, consisting of 7 columns, was utilized. The process was first operated sufficiently long to insure that a truly countercurrent progression of grounds and extract liquor existed before taking data and test extract drawoffs. This was accomplished by sequentially adding columns to the process until the total was six operating columns. As the extract drawoff began from the first column, i.e. the fresh extraction column, the last column, i.e. the column containing the most nearly spent coffee, was taken out of the process, emptied, and refilled to be used again. This procedure is known in the art as startup.

A blend of 24.4% Primes, 60.2% Brazils, 9.4% Arabicas, and 6% Robustas was roasted to a photovolt color of 55. An average weight of 19.1 pounds of the roasted and ground coffee was placed in each column. Each column was five feet in length and six inches in diameter.

After startup the temperatures in the extraction train starting with the column containing the most spent coffee grounds and progressing to the fresh extraction column as measured at the inlet to each column and recorded at the beginning of extract draw-off were as follows: 353° F., 344° F., 339° F., 335° F., 278° F., and 229° F. The temperature of the extract being drawn off the fresh extraction column was 209° F. The pressure at the fresh extraction column outlet was near atmospheric. A pressure of 150 p.s.i.g. was maintained on the other five columns. The draw-off ratio was 1.92 and the average cycle time was 20.1 minutes. The vapors from the fresh extraction column were condensed and the entire extract cooled to 50° F. by passing the fresh column extract through a chilled water heat exchanger. The fresh extraction column was exhausted through the chilled water heat exchanger to an open weigh tank. The percentage yield of solubles based on the roast and ground coffee was 44.0%.

The resultant coffee extract of this example contains 23% solubles. Nine grams of the extract is diluted with 150 grams of water and tasted by an expert taste panel. The results obtained from the taste panel shows that the coffee made from the coffee extract of this example is preferred over a coffee made from a coffee extract produced in the conventional manner.

Gas chromatographic analysis of the extract of this process shows it to have more brew-likeness than an extract produced by a conventional method.

What is claimed is:

1. In a process for the production of coffee extract by a countercurrent extraction column process, the improvement which comprises: maintaining within the fresh extraction column a temperature within the range of from 160° F. to 260° F., and a pressure of from 5 p.s.i.a. to 35 p.s.i.a., adjusting the temperature-pressure relationship to provide a liquid phase in equilibrium with a vapor phase, said vapor phase selectively removing from the roast and ground coffee in said column valuable aromatic flavor notes, drawing off vapors and liquid from the fresh extraction column, condensing the vapors and collecting the condensed vapors and liquid to provide a flavorful extract, said process employing a cycle time of from 5 minutes to 45 minutes.

2. The process of claim 1 wherein up to 10% by weight of the extraction liquor is transformed into vapor phase within the fresh extraction column.

3. The process of claim 1 wherein the temperature is from 180° F. to 250° F.

4. The process of claim 1 wherein the temperature is from 220° F. to 250° F.

5. The process of claim 1 wherein the pressure is from 15 p.s.i.a. to 20 p.s.i.a.

6. The process of claim 1 wherein the cycle time is from 15 minutes to 35 minutes.

7. The process of claim 1 wherein the cycle time is from 15 minutes to 25 minutes.

8. The process of claim 1 wherein the drawn-off vapors and liquid are passed through a chilled heat exchanger.

References Cited

UNITED STATES PATENTS

| | | | |
|---|---|---|---|
| 3,529,968 | 9/1970 | Hair et al. | 99—71 |
| 3,361,572 | 1/1968 | Nutting et al. | 99—71 |
| 2,515,730 | 7/1950 | Ornfelt | 99—71 |
| 2,915,399 | 12/1959 | Guggenheim et al. | 99—71 |
| 2,915,403 | 12/1959 | Clinton et al. | 99—71 |
| 3,089,772 | 5/1963 | Bowden et al. | 99—71 |
| 3,224,879 | 12/1965 | Di Nardo | 99—71 |
| 3,244,530 | 4/1966 | Byer et al. | 99—71 |

FRANK W. LUTTER, Primary Examiner

W. L. MENTLIK, Assistant Examiner